(12) United States Patent
Liu et al.

(10) Patent No.: US 7,311,301 B2
(45) Date of Patent: Dec. 25, 2007

(54) HOOK PIN UNIT HAVING WELD SLAG PROTECTION

(75) Inventors: Xu Liu, Troy, MI (US); Douglas D. Colby, Clarkston, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 161 days.

(21) Appl. No.: 11/196,011

(22) Filed: Aug. 2, 2005

(65) Prior Publication Data

US 2006/0103063 A1 May 18, 2006

Related U.S. Application Data

(60) Provisional application No. 60/599,185, filed on Aug. 3, 2004.

(51) Int. Cl.
*B23Q 1/00* (2006.01)
(52) U.S. Cl. .............................. 269/32; 269/47; 269/49
(58) Field of Classification Search ................. 269/32, 269/24–27, 228, 20, 47, 49; 279/2.06, 2.09
See application file for complete search history.

(56) References Cited

U.S. PATENT DOCUMENTS

| 2,377,086 | A | 5/1945 | Lang |
| 6,102,383 | A | 8/2000 | Tunkers |
| 6,364,300 | B1 * | 4/2002 | Kita .............................. 269/32 |
| 6,439,560 | B2 | 8/2002 | Sawada et al. |
| 6,698,736 | B2 * | 3/2004 | Dugas et al. .................. 269/32 |
| 7,029,000 | B2 * | 4/2006 | Petit et al. ..................... 269/47 |
| 2004/0070130 | A1 | 4/2004 | Pavlik et al. |

FOREIGN PATENT DOCUMENTS

| EP | 1 391 266 A2 | 2/2004 |
| FR | 2 675 417 | 10/1992 |
| GB | 500632 | 2/1939 |
| JP | 2003275932 | 9/2003 |
| WO | WO 03/041913 A1 | 5/2003 |
| WO | WO 2004/004977 A2 | 1/2004 |

* cited by examiner

*Primary Examiner*—Lee D. Wilson
(74) *Attorney, Agent, or Firm*—Raggio & Dinnin, P.C.

(57) ABSTRACT

A hook pin unit for use in a manufacturing environment. The hook pin unit includes a pin having an orifice through a surface. A base having an orifice with the pin arranged within the orifice of the base. A hook arranged within the pin and moveable between a first and second position.

16 Claims, 3 Drawing Sheets

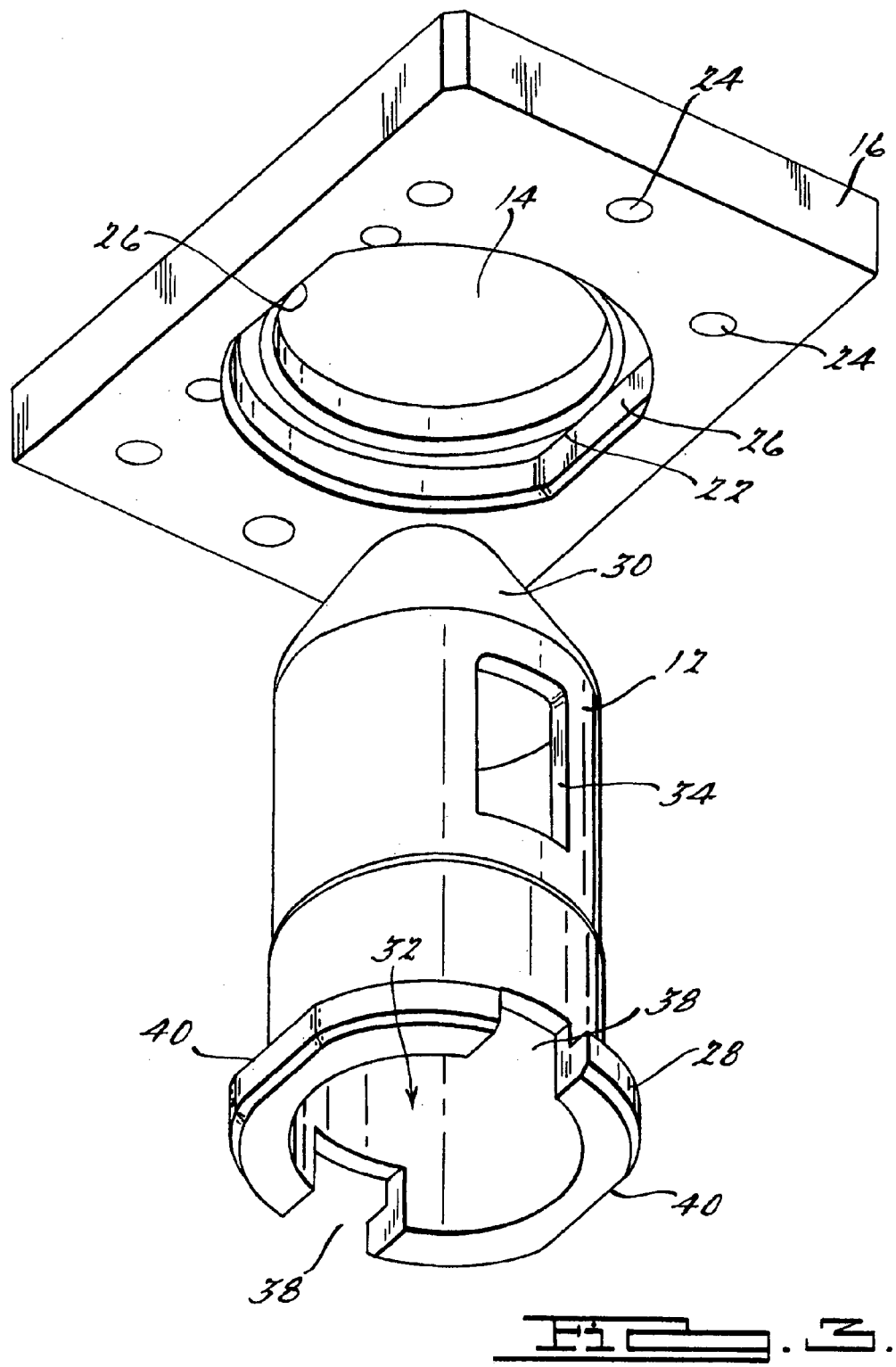

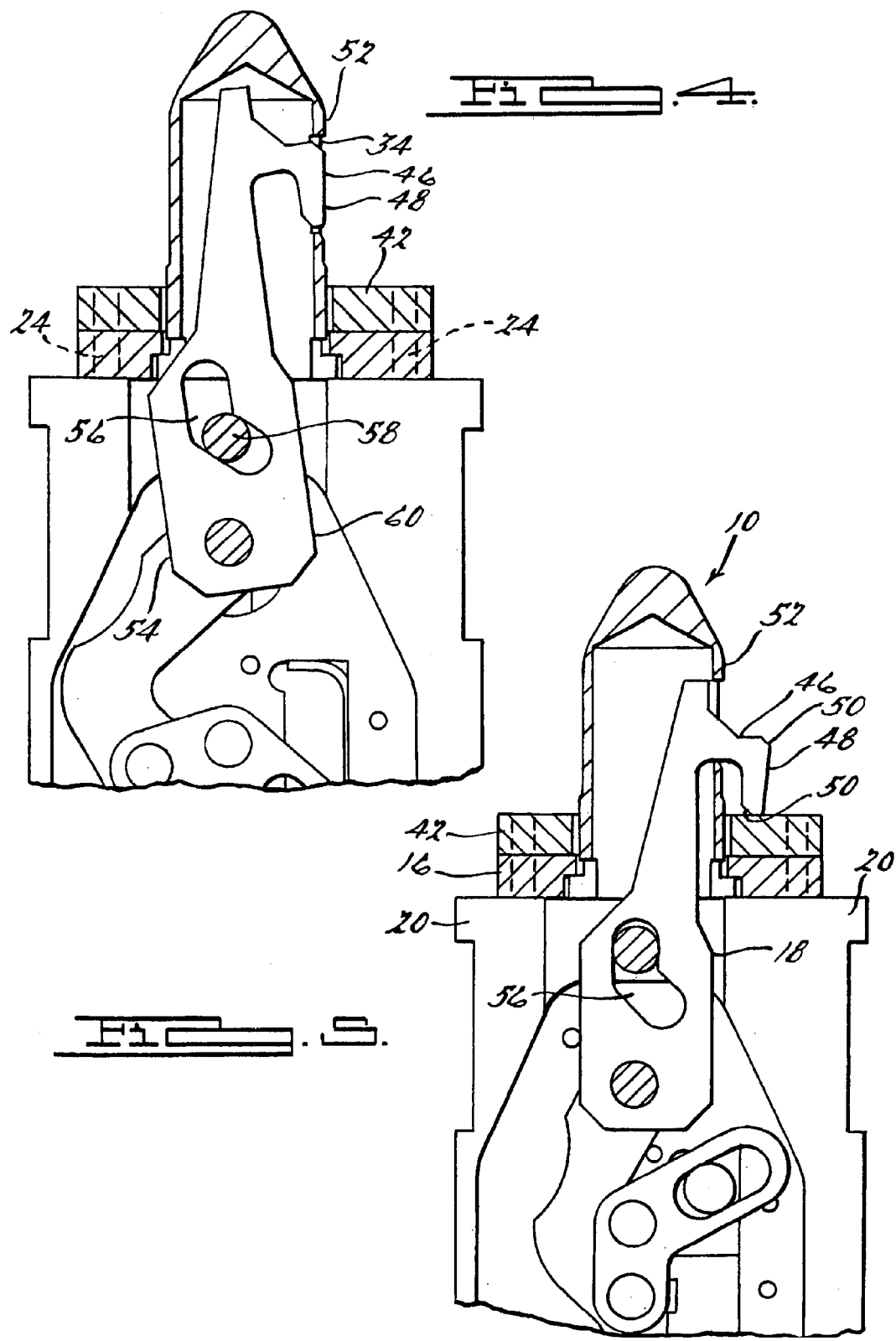

HOOK PIN UNIT HAVING WELD SLAG PROTECTION

This application claims the benefit of provisional application 60/599,185 filed Aug. 3, 2004

BACKGROUND OF THE INVENTION

1. Field of the Invention

The present invention generally relates to clamps but more particularly relates to a hook pin unit having a contaminate shield to protect the unit in the manufacturing environment.

2. Field of the Related Art

Hook pin assemblies have been known for numerous years in robotic and manufacturing applications. A hook pin assembly in one application may be used with a robot end effector to hook a work piece or material to a specified work station such that an operation can be performed on the work piece. A specific prior art example hook pin assembly can be found in the automobile industry, there the hook pin assemblies are used to secure an automobile body to a frame assembly, wherein the frame assembly is connected to and moves the automobile body down a manufacturing line. The assemblies are used in conjunction with a hook mechanism which enters the hook pin assembly and latches against the stop surface. Generally the hook is placed with a force thereupon to ensure the hook is not disengaged from the pin during operation of the work piece in the work environment.

Prior art hook pin assemblies include a single unitary hook pin unit. These prior art hook pin units generally have a rectangular portion that includes an appendage extending from one side of the rectangular portion. The prior hook pin units also include a channel through the appendage of the hook pin unit along an axis of the appendage. The channel extends completely through both outer surfaces of the appendage and creates a locking surface to which a hook will engage during work piece operations. The rectangular portions of a prior art hook pin unit includes a plurality of holes such that it can be connected to an end effector of a robot or to a work piece unit depending on the configuration of the work environment.

However, there have been problems in the prior art with the hook pin units such that if a pin fails the entire line has to be stopped to replace the hook pin unit. This reduces productivity and increases the cost of manufacturing the work piece article. Furthermore, the one piece pin units are more complicated to make and often tend to be very heavy. Also the prior art hook pin units are not robust and had to be replaced frequently. Also many of the prior art hook pin units were very susceptible to weld slag contamination thus reducing the reliability and life cycle of such hook pin units.

Therefore, there is a need in the art for an improved hook pin assembly that reduce costs, is stronger, more robust, is immune to weld slag, has a longer life cycle and is easier to maintain and repair in the work place environment.

SUMMARY OF THE INVENTION

One object of the present invention is to provide an improved hook pin unit.

Another object of the present invention is to provide weld slag protection when a hook pin clamp is in an open or closed position.

Still another object of the present invention is to provide a pin member that is removable, light weight and having a reduced size.

According to the present invention, the foregoing and other objects and advantages are obtained by a novel design for an improved hook pin unit having weld slag protection for use in an automotive environment. The hook pin unit includes a pin in contact with a base member and a hook member arranged within the bore of the pin. The hook member moves between an unhooked position and a hooked position with respect to the pin and base member such that the pin is always protected from contamination from weld slag and the like in the automotive vehicle environment.

Other objects, features and advantages of the present invention will become apparent from the subsequent description and appended claims taken in conjunction with the accompanying drawings.

BRIEF DESCRIPTION OF THE DRAWINGS

FIG. 3 shows an exploded view of the hook pin unit according to the present invention.

FIG. 4 shows a cross section of the hook pin unit according to the present invention.

FIG. 5 shows a cross section of the hook pin unit according to the present invention.

DESCRIPTION OF THE PREFERRED EMBODIMENT(S) AND BEST MODE FOR CARRYING OUT THE INVENTION

Figure 1:
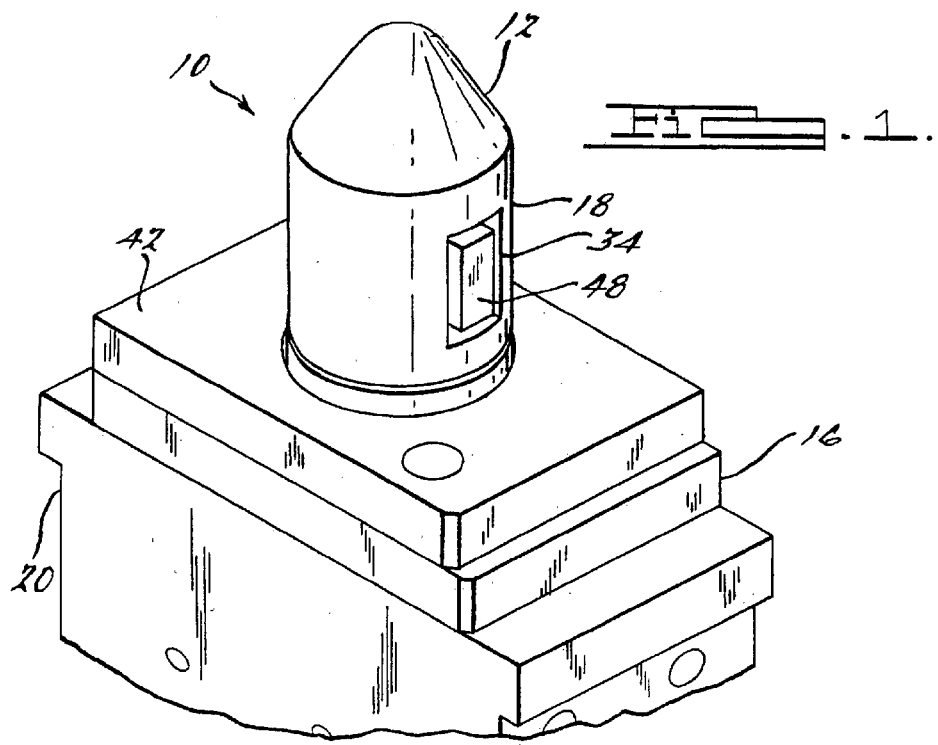
FIG. 1 shows a hook pin unit in perspective in a closed position according to the present invention.

Referring to the drawings, FIGS. 1 through 5 show one embodiment of the hook pin unit 10 according to the present invention. The hook pin unit 10 includes a pin 12 arranged within an orifice 14 of a base portion 16 of the hook pin unit. The hook pin unit 10 further includes a hook member 18 that is movable between an unhooked or an unclamped position and a hooked or clamped position. FIG. 1 shows the hook pin unit 10 in an unhooked or unclamped position. The hook pin unit 10 of the present invention also is impervious to and offers protection from weld slag which is found in the automotive manufacturing environment. The hook member 18 will provide a barrier to any weld slag from entering the hook pin unit 10 in both an unclamped or unhooked position and hooked or clamped position. These two positions can be seen in the Figures.

Figure 2:
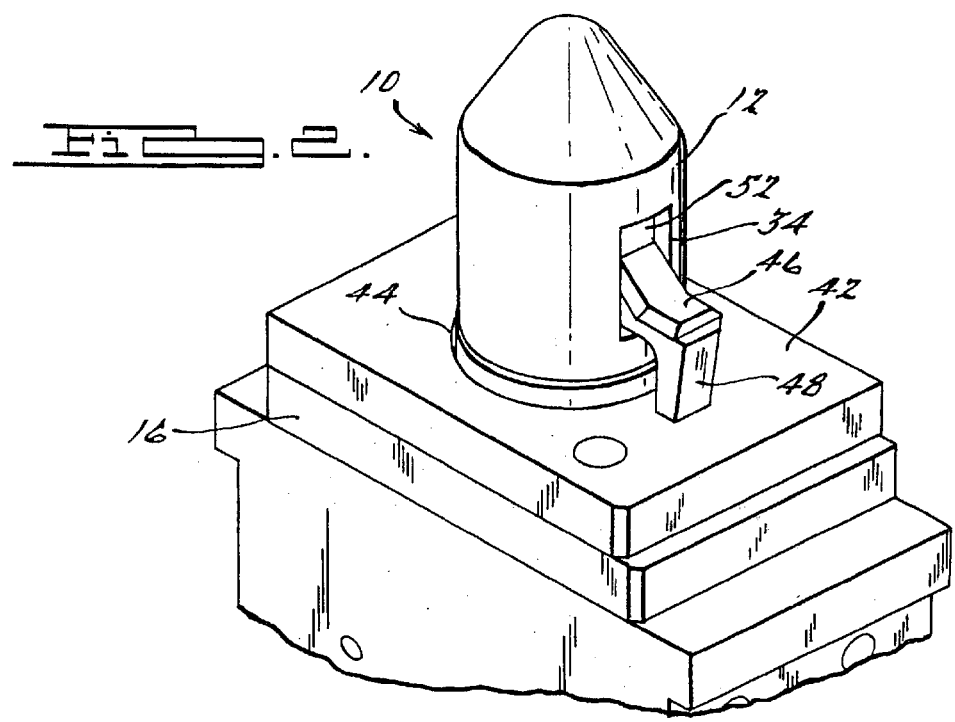
FIG. 2 shows a hook pin unit in its clamped position or hooked position according to the present invention.

FIG. 1 shows a hook pin unit 10 in its unhooked position attached to a clamp or other component 20. It should be noted that the clamp 20 shown is just one possible embodiment and that the hook pin unit 10 may be attached thereto and that many other combinations and components including power clamps, electric clamps, manual clamps, and the like may use a hook pin unit 10 therein. FIG. 2 shows the same hook pin unit 10 in its hooked or clamped position. The hook pin unit 10 includes a base portion 16 that is connected to either the end effector, robot, tool, component, or clamp 20 for use in the work environment or to a work piece which would be worked on in the manufacturing environment. Generally, the base member 16 can have any shape such as but not limited to a rectangle, square, circle, oval, etc. The base member 16 includes a generally circular orifice 14 through a center point thereof. The base member 16 also includes a circular circumferential shoulder or stop 22 located at a predetermined distance within the circular orifice 14 of the base member 16. A plurality of cavities and/or orifices 24 are arranged through or placed into a surface of the base member 16. The plurality of orifices 24 may be through the entire width of the base member 16 if need be or used in the form of cavities which extend a predetermined distance into a width of the base member 16. The cavities or orifices 24 can be placed on both sides of the base member 16. The cavities and/or orifices 24 are used to connect the base member 16 to a surface of a clamp 20 or the like. The circumferential shoulder 22 within the circular orifice 14 of the base member 16 acts as a stop such that the pin member 12 is inserted within the orifice 14 and stops against the circumferential shoulder 22 and is held in place therewith. The circular orifice 14 also includes a flat edge 26 on one or both sides thereof which will allow for the pin member 12 to be inserted into the base member 16 in a specific manner or direction. This will allow for proper alignment of the hook pin unit 10 with relation to the work piece or component being clamped or hooked. The two flat surfaces or edges 26, on opposite sides of the circular orifice 14, will act as a key to lock the pin member 12 within the base member 16 at a predetermined position. It should be noted that the base member 16 generally is made of a steel material, however any other metal, hard plastic, ceramic, composite or the like may be used to form the base member 16 for the hook pin unit 10.

The hook pin unit 10 also includes a pin member 12 that is arranged within the orifice 14 of the base member 16. The pin member 12 generally has a conical shape. The pin member 12 has a circular shaped flange 28 on one end thereof. The opposite end has a cone shaped tip 30. The pin member 12 has a generally cylindrically shaped inner bore or cavity 32 that extends longitudinally along the axis of the pin member 12 a predetermined distance. The cavity 32 generally has a cone shaped end to allow for movement of the hook member 18 within the inner bore or cavity 32 of the pin member 12. The pin member 12 also includes a generally rectangular shaped orifice 34 through one side surface thereof. The rectangular shaped orifice 34 may be any other shape depending on the design and manufacturing requirements for the hook member 18 and the hook pin unit 10 manufacturing environment. The rectangular orifice 34 is presized and located at a position that will allow for the hook member 18 to move a predetermined distance until it engages with a part or machine that is being clamped. The pin member 12 also includes a first and second cutout 38 arranged at an end of the body portion of the pin member 12. The cutout 38 also removes a portion of the circumferential flange 28 located at one end of the pin member 12. The first and second cutout areas 38 are arranged across from each other and at 90° from flat surfaces 40 of the circumferential flange 28 of the pin. The circumferential flange 28 includes a first and second flat surface 40 that will align with and mate with the first and second flat surfaces 26 of the base member 16 to allow for the pin 12 to be installed in the base member 16 in a predetermined position. The cutouts 38 in the pin member 12 will allow for movement of the hook member 18 between the unhooked and hooked positions. It should be noted that the pin member 12 is generally made of a steel material, however any other metal, ceramic, hard plastic, composite or the like may also be used for the pin member.

FIGS. 1 through 5 show the pin member 12 arranged within the base member 16 and then the base member 16 secured and contacting a clamp 20 on one side thereof and having a spacer 42 arranged and contacting an opposite side surface of the base member 16. The spacer 42 also includes a circular orifice 44 through a center point thereof. The spacer 42 is arranged over the pin member 12 and in contact with the base member 16 on a top surface thereof. The spacer 42 will allow for a predetermined distance to exist between the hook member 18 in its clamped or hooked position and the surface of the spacer 42. In the embodiment shown the hook member 18 engages the spacer 42, however in other contemplated embodiments the hook member 18 will have a predetermined distance or gap between the end of the hook member 18 and the spacer 42. This will allow for precise hook and clamping effects for the work piece being operated on in the manufacturing environment. It should be noted that it is contemplated to use the hook pin unit 10 without a spacer 42.

The hook pin unit 10 also includes a hook member 18. The hook member 18 is arranged within the inner bore 32 of the pin member 12. It should be noted that the hook member 18 is made of a steel material in one embodiment, however any other metal, ceramic, composite, hard plastic or the like may also be used for the hook member 18. The hook member 18 includes a hook arm 46 extending from or near one end thereof. The hook arm 46 generally has an L-shape that extends from a surface of the hook member body 18. The hook arm 46 extends from the hook member body 18 at a predetermined position on the body. The hook arm 46 includes a flat outer surface 48 that will act as a protective barrier for the hook pin unit 10 when the hook pin unit 10 is in its closed or unhooked position. As shown in FIG. 1, the flat surface 48 of the hook arm 46 will align with the outer surface of the pin member 12 and create a protective barrier or shield that is flat and aligned with the outer surface of the pin member 12. This will ensure that no weld slag is capable of entering and contaminating the interior of the hook pin unit 10 when the hook pin unit 10 is not in operation. The hook arm 46 includes an angle surface 50 at a top end thereof and at a bottom end thereof to allow for easier insertion into the rectangular orifice 34 of the pin member 12. It is also contemplated to put a sealing mechanism between the surface of the hook arm 46 and the rectangular orifice 34 of the pin member 12. Such a seal is not shown in the embodiment of FIGS. 1 through 5. The hook member 18 includes an extension 52 that extends a predetermined distance above the transition between the hook arm 46 and the hook member 18 of the present invention. The extension 52 of the hook member body 18 has a flat surface that is parallel to a surface of the body portion of the pin member 12 when the hook pin unit 10 is hooked or clamped. As shown in FIGS. 2 and 5 the extension flat surface 52 of the base member 16 above the hook arm 46 will serve as a second shield or barrier to weld slag in the manufacturing environment. This second shield or barrier will protect the hook pin unit 10 from internal contamination from weld slag in the manufacturing environment during clamped procedures. As shown in FIG. 5 the second shield or barrier surface 52 aligns with the rectangular orifice 34 on an inside surface of the pin member 12. However, it is contemplated to have surface 52 align with an outside surface of pin 12 or at any other known position. This will ensure that no weld slag enters the hook pin unit 10 when the hook pin unit 10 is in its hooked or clamped position. A surface of the hook arm 46 will align with and provide protection for the bottom portion of the rectangular orifice 34 as shown in FIGS. 2 and 5.

The hook member 18 also includes a generally circular orifice 54 at one end thereof and a generally L-shaped orifice or track 56 located near a center portion of the hook member 18. It should be noted that the orifices 34, 56 may be of any predetermined shapes, and that the L-shaped orifice 56 may be of any predetermined length and include any predetermined angle therein to allow for proper positioning of the hook arm 46 with respect to the component being hooked in both the open and closed positions. As shown in FIGS. 4 and 5 a pin, fastener 58 or the like is arranged within the L-shaped orifice 56 of the hook member 18 and a pin 60 or the like is arranged in a circular orifice 54 of the hook member and allows for the hook member 18 to rotate with respect to internal links of the clamp unit 20. It should be noted that a pin 58, 60 is shown but any other type of fastener, dowel, pole, or the like may be used in either of the orifices 54, 56 shown. It should further be noted that the orifice 54 may be of any known shape but in the embodiment shown it is generally of a circular design. The internal linkage of the clamp 20 will rotate the hook member 18 from its unclamped or unhooked position to its hooked position. The internal linkages of the clamp unit 20 will urge the hook member 18 to travel in a downward position with relation to the pin 58 arranged within the L-shaped orifice 56 until the pin 58 is in contact with or near the top portion of the L-shaped orifice 56. The pin 58 following the L-shaped orifice or track 56 will secure the hook arm 46 into its hooked or clamped position. Therefore, it should be noted that it is contemplated to change the shape and length of the orifice 56 to any known shape or length in order to allow for a variety of hooked or clamped variations in the manufacturing environment.

In operation the hook pin unit 10 will move between a hooked and unhooked position while providing a barrier which will protect the hook pin unit 10 from weld slag found in the manufacturing environment. The barrier is formed by either a flat surface 48 on an end of the hook arm 46 or by an extension surface 52 of the hook member 18 when the hook arm 46 is in its fully hooked or clamped position. This will allow for the hook pin unit 10 to operate in the manufacturing environment in a much more durable manner thus increasing the longevity and decreasing any down time of the manufacturing line due to replacement and cleaning of hook pin units 10. It should also be noted that the pin member 12 is removable, lighter in weight, smaller in size and will reduce down time of the manufacturing lines. These pin members 12 are generally made of a hardened steel but any other metal material, hard ceramic, plastic, composite, etc., may also be used depending on the design requirements and strength needed for the manufacturing job of the hook pin units 10.

Other contemplated embodiments may also be designed and shown from the above mentioned discussion and the attached drawings to include any known designs in the art for such pin assemblies to create a hook pin unit 10 instead of the traditional prior art one or two piece hook pins.

While it may be apparent that the preferred embodiments of the invention disclosed are well calculated to fill benefits, objects, or advantages of the invention, it will be appreciated that the invention is susceptible to modifications, variations and change without departing from the proper scope of the invention as shown.

What is claimed is:

1. An apparatus for holding a workpiece, said apparatus including:
   a pin having an orifice through a surface thereof;
   a base having an orifice therethrough, said orifice through said base having a flat edge which will align and hold said pin at a predetermined position, said pin arranged within said orifice of said base, said base having a circumferential shoulder; and
   a hook arranged within said pin, said hook extends through said orifice of said pin in a first position and aligns with said surface and creates a barrier for said pin in a second position.

2. The apparatus of claim 1 wherein said pin having a cavity therein.

3. The apparatus of claim 1 wherein said pin having a circumferential flange on one end.

4. The apparatus of claim 3 wherein said pin having at least one notch in an end of said pin, said flange having a flat surface that will align with a flat surface of said base.

5. The apparatus of claim 4 wherein said hook aligns with said notch to allow movement of said hook between said first and said second position.

6. The apparatus of claim 1 wherein said hook having an arm, said and having a flat surface that acts as said barrier in said second position.

7. The apparatus of claim 6 wherein said hook having an extension member that extends from an end of said hook, said extension member creates a barrier when said pin is in said first position.

8. The apparatus of claim 1 further including a spacer arranged over said pin and in contact with said base.

9. The apparatus of claim 1 wherein said hook including an orifice and a track therein.

10. A clamp for use in manufacturing, said clamp including:
    a body;
    a hook pin base secured to said body on an end thereof said hook pin base having an orifice therethrough;
    a pin arranged in said orifice of said hook pin base, said pin having an inner bore and an orifice through a surface thereof, said pin having a circumferential flange on one end and a first and second notch in said end having said circumferential flange, said circumferential flange having a first and second flat edge, said base having a circumferential stop which interacts with said flange of said pin, said stop having a first and second flat surface which aligns with said flat edges of said pin to align said pin in a predetermined position; and
    a hook at least partially arranged within said inner bore of said pin, said hook extends through said orifice of said pin in a first position and aligns with said surface of said pin and creates a barrier across said orifice of said pin in a second position.

11. The clamp of claim 10 wherein said hook having an arm, said arm having a flat surface that acts as said barrier in said second position.

12. The clamp of claim 10 wherein said hook having an extension at a top end thereof, said extension having a flat surface that creates a barrier for said pin in said from position.

13. The clamp of claim 12 wherein said hook having at least one orifice and a track therein.

14. The clamp of claim 13 wherein said orifice connects to a linkage member of the clamp, said track guides said hook between said first and second position.

15. The clamp of claim 10 further including a spacer arranged on said pin and in contact with said hook pin base.

16. The clamp of claim 10 wherein said orifice of said pin generally having a rectangular shape.

* * * * *

UNITED STATES PATENT AND TRADEMARK OFFICE
CERTIFICATE OF CORRECTION

| | |
|---|---|
| PATENT NO. | : 7,311,301 B2 |
| APPLICATION NO. | : 11/196011 |
| DATED | : December 25, 2007 |
| INVENTOR(S) | : Liu et al. |

It is certified that error appears in the above-identified patent and that said Letters Patent is hereby corrected as shown below:

Col. 6, Line 52, Claim 12 - Please delete "from" and insert -- first -- after "for said pin in said"

Signed and Sealed this

Thirteenth Day of May, 2008

JON W. DUDAS
*Director of the United States Patent and Trademark Office*